(12) United States Patent
Montenegro et al.

(10) Patent No.: US 6,354,722 B1
(45) Date of Patent: Mar. 12, 2002

(54) VEHICLE LAMP HAVING A LINEARLY MOVABLE REFLECTOR

(75) Inventors: Cesar Lopez Montenegro, São Paulo (BR); Jean Paul Ravier, St Maur des Fosses (FR)

(73) Assignee: Valeo Vision (FR)

( * ) Notice: Subject to any disclaimer, the term of this patent is extended or adjusted under 35 U.S.C. 154(b) by 0 days.

(21) Appl. No.: 09/510,447

(22) Filed: Feb. 22, 2000

(30) Foreign Application Priority Data

Feb. 22, 1999 (FR) .............................. 99 02161

(51) Int. Cl.[7] .................................................. F21V 7/00
(52) U.S. Cl. ........................ 362/514; 362/507; 362/277; 362/282; 362/323; 362/421; 362/449
(58) Field of Search ................................ 362/507, 508, 362/531, 512, 514, 277, 280, 288, 286, 319, 318, 464, 465, 467, 524, 188, 174, 176, 306, 449, 282, 322, 421

(56) References Cited

U.S. PATENT DOCUMENTS

| | | | | |
|---|---|---|---|---|
| 1,083,530 A | * | 1/1914 | Gallay | 362/288 |
| 1,512,158 A | * | 10/1924 | Bragg et al. | 362/286 |
| 1,674,650 A | * | 6/1928 | Leser | 362/188 |
| 5,806,964 A | * | 9/1998 | Maglica | 362/203 |
| 5,911,502 A | * | 6/1999 | Zillgitt et al. | 362/508 |
| 5,971,574 A | * | 10/1999 | Taniuchi et al. | 362/508 |
| 6,004,008 A | * | 12/1999 | Lai | 362/280 |
| 6,007,221 A | * | 12/1999 | Taniuchi et al. | 362/465 |
| 6,152,584 A | * | 11/2000 | Tsukamoto | 362/465 |
| 6,174,071 B1 | * | 1/2001 | Chan | 362/187 |

FOREIGN PATENT DOCUMENTS

| | | |
|---|---|---|
| EP | 0 791 780 | 8/1997 |
| FR | 2 276 195 | 1/1976 |
| FR | 2 432 405 | 2/1980 |
| FR | 2 765 308 | 12/1998 |

* cited by examiner

Primary Examiner—Sandra O'Shea
Assistant Examiner—Ismael Negron
(74) Attorney, Agent, or Firm—Morgan & Finnegan, LLP

(57) ABSTRACT

A vehicle headlight has a cam mechanism for displacing the reflector and the light source of the headlight with respect to each other, between two relative positions in which the headlight emits two different types of light beam. The cam mechanism comprises a first cam member and a second cam member, and it converts rotation of the first cam member about an axis of rotation into a first straight line motion of the second cam member. The first straight line motion is collinear with the axis of rotation.

10 Claims, 5 Drawing Sheets

VEHICLE LAMP HAVING A LINEARLY MOVABLE REFLECTOR

FIELD OF THE INVENTION

The present invention relates in general terms to the field of motor vehicle headlights, and in particular those which are capable of emitting, from a single light source, two different light beams selectively, with selection of the type of light beam to be emitted being obtained by means of relative motion between a reflector of the headlight and the light source.

BACKGROUND OF THE INVENTION

Headlights of the above general type are already known in the prior art. For example, French published patent specification No. 2 765 308 describes a headlight in which the reflector is displaced with respect to the light source between two positions, firstly by performing a translation (that is to say straight line motion) of the reflector in the general direction of the illumination given by the headlight, and secondly by controlling an adjusting device in such a way as to effect a slight raising of the light emitted, by tilting the component that supports the light source.

That type of headlight is not suitable for use in small vehicles or medium size vehicles, because of the large number of components involved, the size of the components, and the movements involved, because in such vehicles the amount of space available in the engine compartment tends to be more and more restricted.

DISCUSSION OF THE INVENTION

An object of the present invention is to overcome the above mentioned drawback of the prior art.

According to the invention, a vehicle headlight having a cam for displacing a reflector and a light source with respect to each other, for producing two different light beams, the said cam comprising a first member and a second member and being adapted to convert rotational movement of the first cam member about an axis of rotation into a first translational movement of the second cam member, is characterised in that the said first translational movement is collinear with the axis of rotation.

Thus, the fact that the first straight line movement takes place in a manner such that it is collinear with the axis of rotation, enables the number, size and displacement of the components of the mechanism for effecting relative displacement between the reflector and the light source to be reduced as compared with the above mentioned headlights of the prior art.

The reduction in the number of components as compared with the prior art arrangements, which are capable of emitting from a single light source two different kinds of light beam, greatly assists industrial production of the headlights, by reducing the difficulties which are connected with the fact that a high number of components, with complex production lines, make it necessary to adopt production processes which are at the very limits of currently available capabilities. All this therefore means that a headlight in accordance with this invention is easier to manufacture industrially, and is also easier to standardise. In this connection, it is possible to make a lamp support or lamp holder, and a cam system, which are the same for all the headlights for all types of vehicles. This enables the cost of the main beam and dipped beam illumination functions to be reduced.

Preferably, the first cam member and the second cam member are adapted to perform a second translational movement with respect to each other in a plane at right angles to the axis of rotation. This feature enables more precise positioning of the reflector to be obtained with respect to the light source, mainly in the dipped beam position, and with a reduced number of components.

According to a preferred feature of the invention, one of the cam members, that is to say the first cam member and the second cam member, has a toothed sector so that it can be driven in rotation about the axis of rotation by a micromotor. Preferably then, the micromotor is supplied and controlled by the voltages which are available on the electrical networks of the vehicle for dipped beam lighting and main beam lighting. There is therefore no need to modify the wiring as already provided in the vehicle for conventional headlights.

Preferably, the first cam member is adapted to exert a thrust on the second cam member parallel to the axis of rotation, during its rotation with respect to the second cam member.

According to a further preferred feature of the invention, at least one of the said first cam member and second cam member includes a ramp having a surface extending away from a plane at right angles to the axis of rotation, in a path describing a circular arc about the said axis.

Preferably again, the said first cam member and second cam member are formed with a passage for a lamp or a lamp holder.

In preferred embodiments of the invention, when the headlight is fitted on a vehicle, the said first and second straight line motions (or translational movements) are effected along a horizontal axis and a vertical axis respectively.

Further features and advantages of the invention will appear on a reading of the following detailed description of some preferred embodiments of the invention, which is given by way of non-limiting example only and with reference to the accompanying drawings.

DESCRIPTION OF PREFERRED EMBODIMENTS OF THE INVENTION

Figure 1:
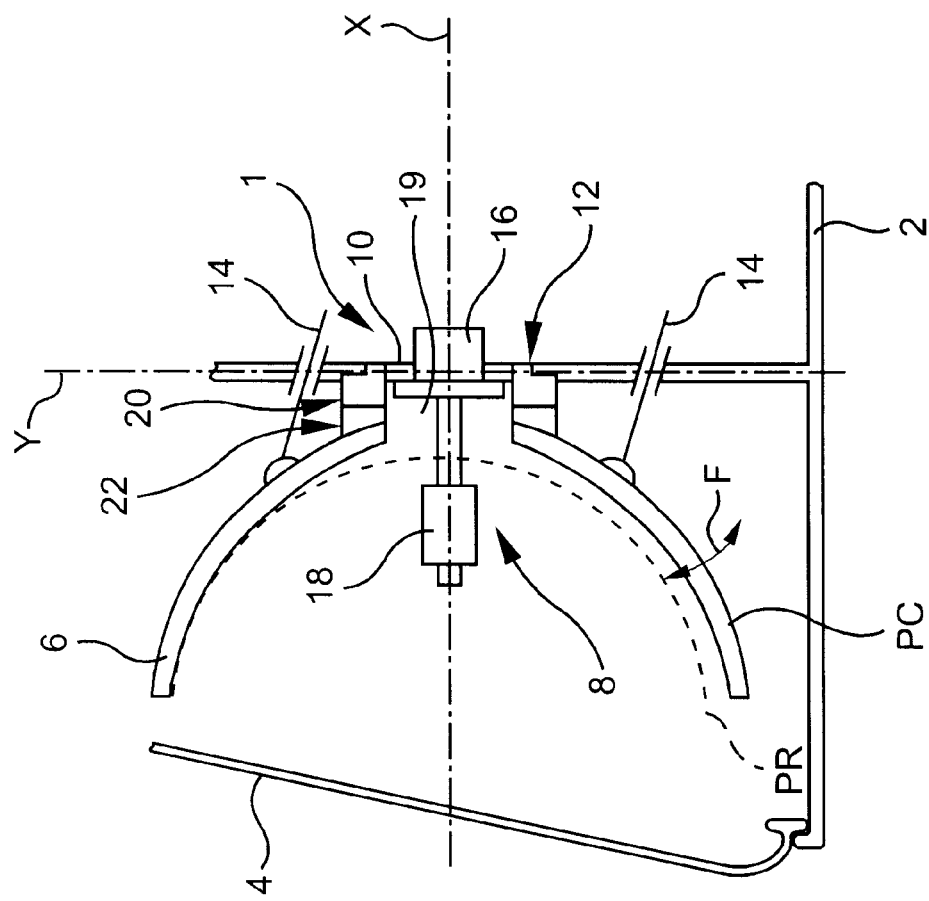
FIG. 1 is a diagrammatic view in cross section taken through the middle, on a vertical plane parallel to the direction of illumination, of a headlight in accordance with the present invention.

FIG. 1 shows an example of a headlight 1 in accordance with the invention, which is shown diagrammatically. The headlight 1 comprises a casing 2, a front glass 4, a reflector 6, a light source 8, and a fixed base plate 10. In the usual way, the casing 2 is closed at the front, with reference to the direction of illumination, by the front glass 4. The casing 2 encloses the light source 8 which consists of a lamp holder 16 and a lamp 18, and the reflector 6 is also contained within the casing 2. In this embodiment of the invention, the reflector 6 is movable with respect to the light source 8.

The headlight 1 also includes a cam 12 for displacing the reflector 6 with respect to the light source 8, together with guides 14 for retaining the reflector 6 and for guiding its displacement.

The reflector 6 is generally oriented so as to enable the headlight 1 to give illumination in a general direction extending along a horizontal axis X. The reflector 6 is situated between the front glass 4 and the fixed base plate 10. The reflector 6 is provided with a hole through which the lamp 18 can be passed. The lamp 18 is located substantially at the focus of the reflector 6.

The cam 12 enables the reflector 6 to be displaced with respect to the light source 8, from a dipped beam position PC to a main beam position PR, and vice versa. The dipped beam position PC corresponds to illumination by the headlight 1 with a dipped beam. The main beam position PR corresponds to illumination by the headlight 1 with a main or cruising beam.

Displacement from the dipped beam position PC to the main beam position PR is represented in FIG. 1 by the allow F. The offset between the dipped beam position PC and the main beam position PR has been exaggerated in FIG. 1 for clarity. Typically, a main beam with satisfactory photometry is obtained by displacing the reflector forward through a distance of the order of 2 mm.

The shift from the dipped beam position PC to the main beam position PR is obtained firstly by effecting a straight line movement (or translation), in a first translational movement, of the order of 2 mm, of the reflector 6 with respect to the fixed base plate 10 along the projection axis X, and secondly, a vertical straight line movement (or translation) in a second translational movement, of about 1 mm upwards along an axis Y.

The straight line movement in the direction X explained above enables the light source 8 to be defocused with respect to the reflector 6. The main effect of this is to produce a very substantial attenuation in the net cut-off which is obtained in the dipped beam position PC of the reflector 6, and to ensure homogeneous distribution of the light within a horizontal band which is quite extensive but relatively narrow. The distribution of light and the contour of the main beam corresponds to a standard European main beam. In the dipped beam position PC, the beam is cut at the height prescribed by law. As to the movement in vertical translation, this raises the whole of the light which is distributed in the above way, in order that the main beam will be emitted at the height appropriate to the road.

Figure 4:
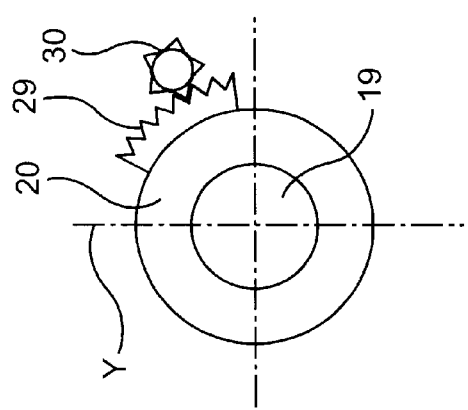
FIG. 4 is a diagrammatic view of components of the mechanism shown in FIGS. 2 and 3, seen parallel to the direction of illumination.
Figure 3:
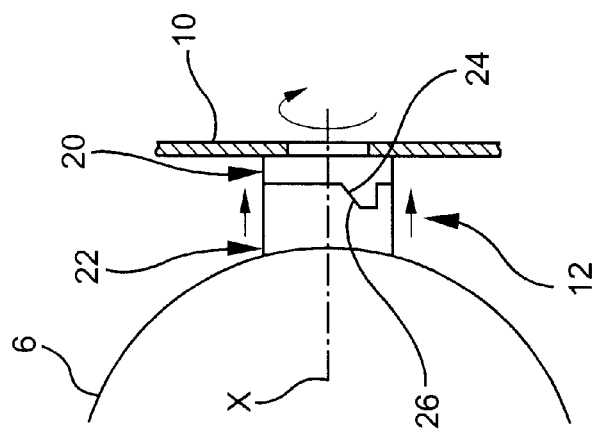
FIG. 3 is a view similar to that in FIG. 2, with the mechanism for displacing the reflector being in a second configuration.
Figure 2:
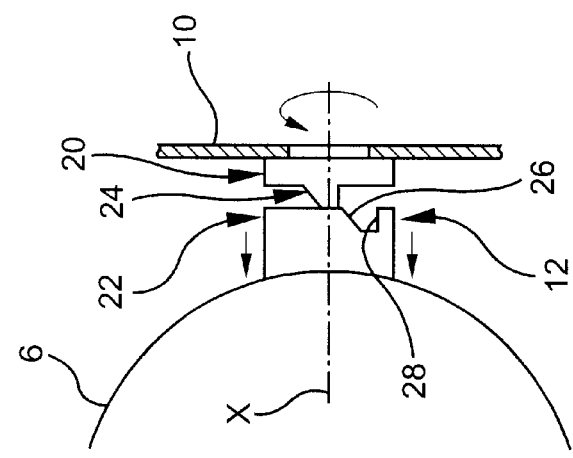
FIG. 2 is a diagrammatic view, again in cross section taken through the middle along a vertical plane parallel to the direction of illumination, and showing one example of a mechanism for displacing the reflector of the headlight shown in FIG. 1, with the headlight in a first configuration.

The cam 12 consists of a first cam member 20 and a second cam member 22. With reference now to FIGS. 2, 3 and 4, these show diagrammatically how this cam 12 operates. FIGS. 2 and 3 show the reflector 6, the cam 12 with its first member 20 and second member 22, and the fixed base plate 10. The second cam member 22 is secured rigidly to the reflector 6. The first cam member 20 is rotatable with respect to the fixed base plate 10, about the axis X. The first cam member 20 and second cam member 22 each consist of an annular ring, having a central zone which is formed as a through hole so as to constitute a passage 19 for the lamp 18.

Each of these rings has two main faces which are substantially at right angles to the axis X. A first main face of the first cam member 20 is in contact with the fixed base plate 10. The first main face of the first cam member 20 is orientated collinearly with the axis X, in the direction of projection of the light beam. This second face is formed with a first ramp 24. The first ramp 24 defines a camming surface in the form of a circular arc around the passage 19. This camming surface is displaced away from a plane at right angles to the axis X, in the clockwise direction when viewed towards the second main face.

One of the two main faces of the annular ring constituting the second cam member 22 is fixed to the reflector 6. The other main face is provided with a second ramp 26. This second ramp 26 defines a camming surface in the form of a circular arc around the passage 19. This last mentioned camming surface is spaced away from a plane at right angles to the axis X in the clockwise direction looking towards the face which includes the second ramp 26.

The respective camming surfaces of the first ramp 24 and second ramp 26 are in engagement with each other and are able to slide against each other. Thus as shown in FIG. 2, when the first cam member 20 rotates about the axis X in the anticlockwise direction (looking towards the face of the first cam member 20 which has the first ramp 24), with respect to the second cam member 22, the first cam member 20 displaces the second member 22 in straight line movement along the axis X and away from the first cam member 20.

Conversely and as shown in FIG. 3, when the first cam member 20 rotates about the axis X in the clockwise direction looking towards the face of the first cam member 20 that has the first ramp 24, with respect to the second cam member 22, the first member 20 and the second member 22 move towards each other. The second member 22 has an abutment 28 for preventing rotation of the first member 20 in that direction.

As shown in FIG. 4, the first member 20 includes, at the periphery of the annular ring which it constitutes, an arcuate toothed sector 29, the teeth of which are radial. These teeth are arranged to cooperate with a toothed wheel 30 which is fixed to a micromotor 33, which can be seen in FIGS. 5 and 6 but which is not shown in FIG. 4. In this way the micromotor 33 drives the first cam member 20 in rotation about the axis X.

Figure 5:
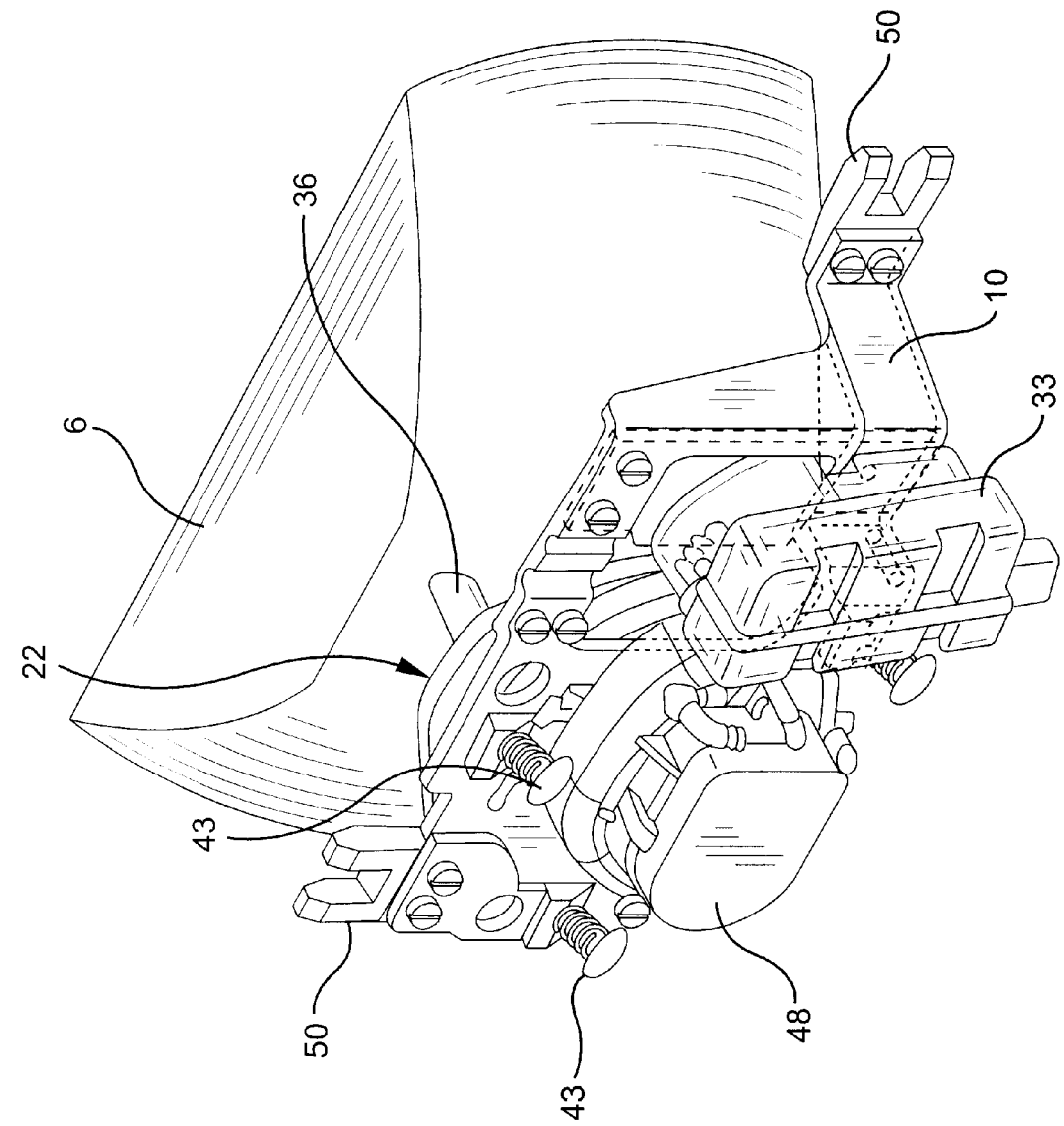
FIG. 5 is a perspective view of one example of a headlight in accordance with the invention.
Figure 6:
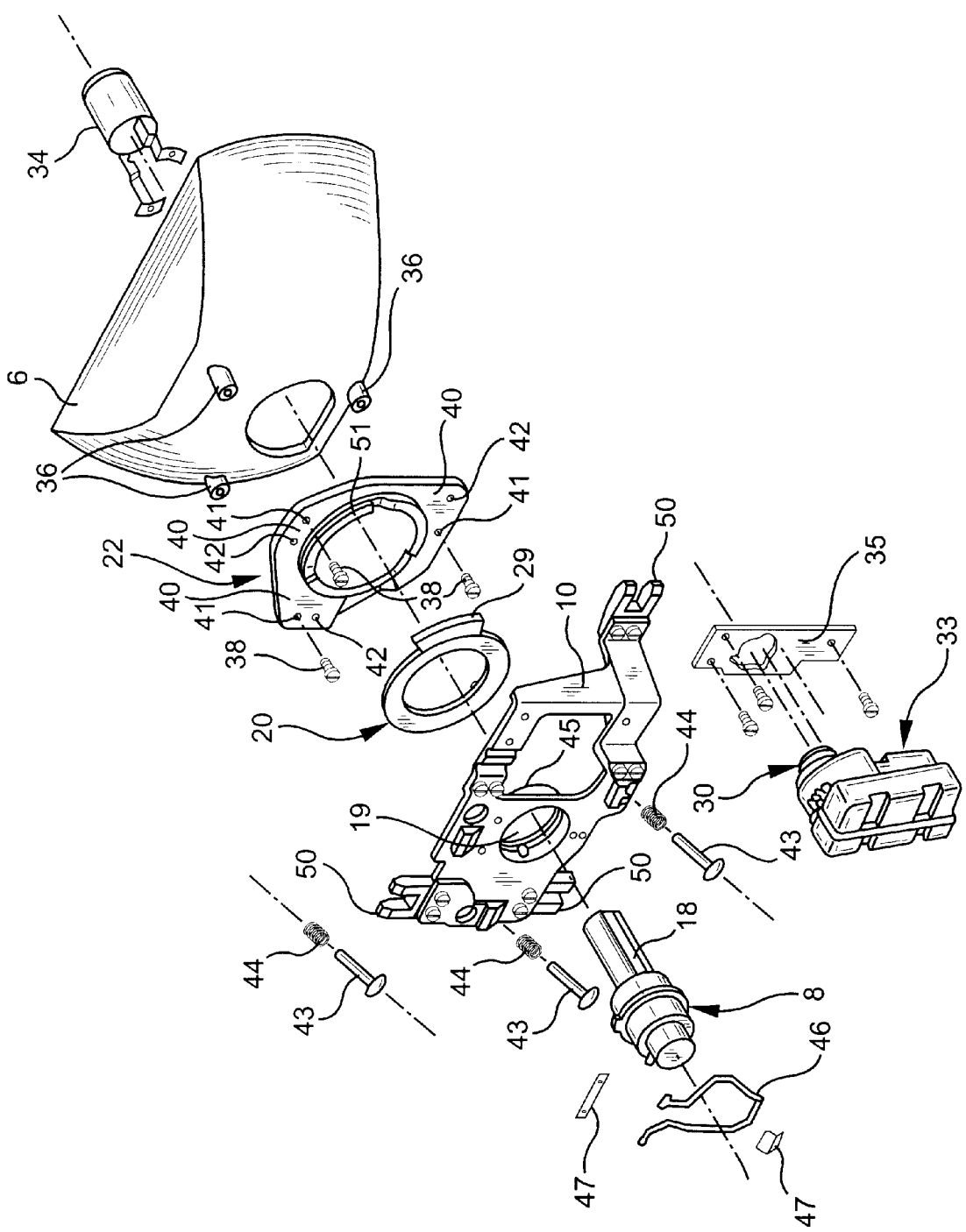
FIG. 6 is an exploded perspective view of the same headlight as is shown in FIG. 5.

Reference is now made to FIGS. 5 and 6, which show one example of a headlight in accordance with the present invention. FIG. 5 is an assembled perspective view, whereas in FIG. 6 the individual components can be seen.

As shown in FIG. 6, in this type of headlight 1, a succession of components is assembled along the axis X in the direction of projection of the beams produced by the headlight 1. These components consist, respectively, of the lamp 18, the fixed base plate 10, the first cam member 20, the second cam member 22, the reflector 6, and a mask or occulter 34. The reflector 6 has three lugs 36 on which are screwed three screws 38 for connecting the second cam member 22 rigidly to the reflector 6. The second cam member 22 has three ears 40, each of which has two through holes 41, 42. One of these, namely the hole 41, takes one of the screws 38 by which the second cam member 22 is fastened on the reflector 6. The other hole in each lug, namely the hole 42, retains the reflector 6 on the fixed base plate 10 by virtue of threaded rods 43 and springs 44.

The threaded rods 43 and springs 44 enable the reflector 6 to be displaced, at the same time along the axis and in a plane at right angles to the axis X, with respect to the fixed base plate 10, between two positions which correspond respectively to the dipped beam position PC and the main beam position PR. The springs 44 act as return springs for biasing the headlight away from the main beam position and towards its dipped beam position PC.

The fixed base plate 10 has a projecting element 45 in the form of a cylinder of revolution about the passage 19, and extending in the direction of projection of the beams produced by the headlight 1. The first cam member 20 is fitted over this projecting element 45, which guides the rotation of the first cam member 20 about the axis X.

Each of the cam components, that is to say the first cam member 20 and the second cam member 22, includes three ramps. Each ramp of each of these cam members 20 and 22 is arranged to cooperate with a ramp of the other cam member. Each ramp rises from the annular ring which constitutes the corresponding cam member 20 or 22, and extends towards a flat 51 when rotated in the clockwise direction about the axis X facing the surface of the annular ring that has the ramps. The surface of the flat 51 is at right angles to the axis X. Thus the displacement of the headlight 1 with respect to the light source 8 in the first straight line movement, is stopped by the flat 51 and not because a stop abutment is met. This enables noise and shocks to be limited, and it improves the working life of the filaments where the lamp 18 is of the incandescent lamp type, while avoiding transitory effects inconvenient to the user when the lamp 18 is of the discharge lamp type.

Figure 7:
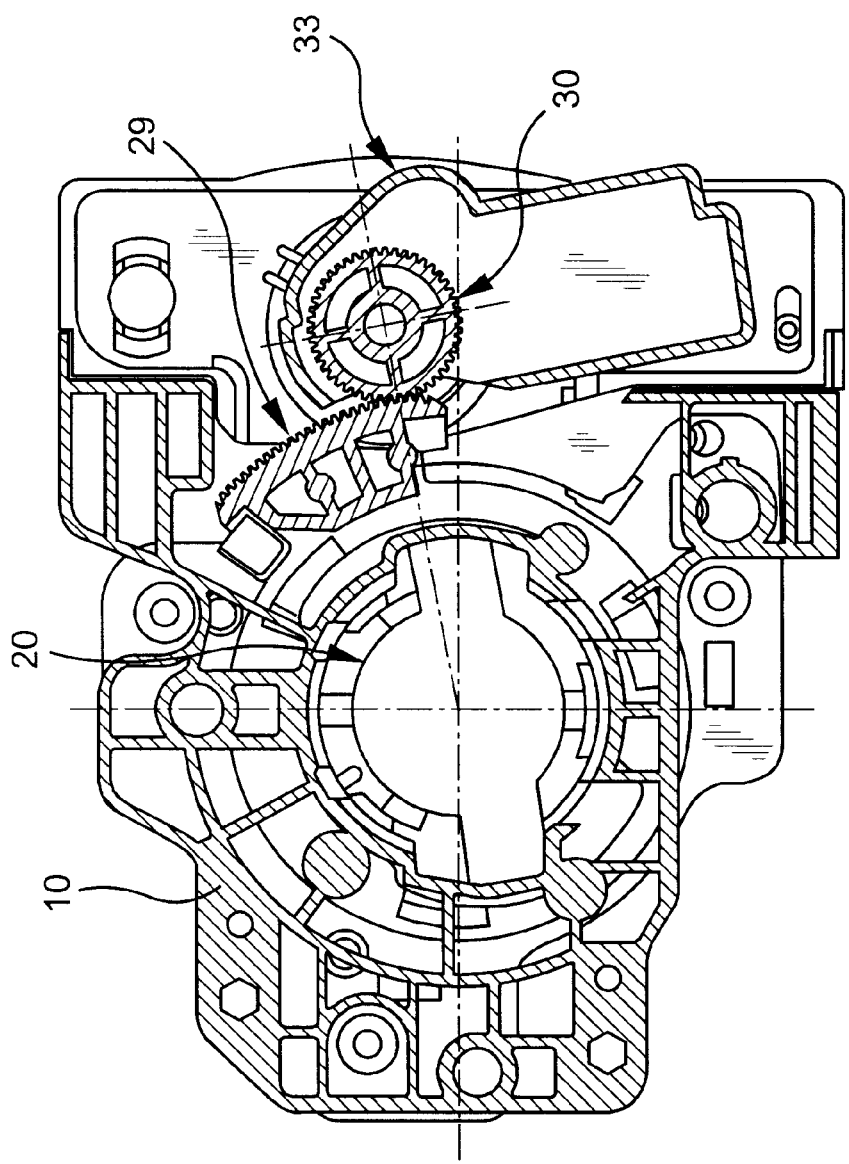
FIG. 7 shows, in a semi-transparent form and in cross section taken on a plane at right angles to the direction of illumination, a base plate and a micromotor with which the headlight shown in FIGS. 5 and 6 to is equipped.

The micromotor 33 is fixed on a support plate 35, which is itself fixed on the fixed base plate 10. The support plate 35 and the fixed base plate 10 define an opening into which the toothed wheel 30 is passed so that the latter comes into cooperation with the toothed sector 29, as shown in FIG. 7.

The micromotor 33 is powered and controlled by the available voltages, via the dipped beam and main beam electrical networks of the motor vehicle, without any need for modification of the wiring appropriate to a conventional headlight.

As is shown in FIG. 6, the lamp 18 is retained on the fixed base plate by means of a clip 46, which is itself fixed on the fixed base plate 10 by means of tongues 47.

As is shown in FIG. 5, the lamp 18 is connected to the electrical power supply circuit of the motor vehicle through a connector 48.

The headlight is mounted on the chassis of the motor vehicle by means of fastening lugs 50 which are screwed on the fixed base plate 10.

In the headlight 1 described above, the reflector 6 is movable with respect to a lamp 18, which is fixed rigidly with respect to the main fixed base plate 10 and therefore to the rest of the chassis of the motor vehicle. However, in another version of the invention, the reflector 6 is fixed with respect to the chassis of the vehicle, while the lamp 18 is movable with respect to the reflector 6.

In yet another version of the invention, the first ramp 24 and the second ramp 26 may be replaced by threaded elements which cooperate with each other. Preferably in that case, the threads have a sufficiently large clearance between them to give a displacement in a plane at right angles to the axis of screwing and unscrewing of the threads one inside the other.

A version of the headlight of the invention has been described above which enables a headlight with a single light source to produce, selectively, a main beam and a dipped beam. However, in other versions, the headlight is such as to produce a foglight beam or a long range driving beam, again using a single light source.

What is claimed is:

1. A vehicle headlight comprising: a light source; a reflector adjacent to the light source for reflecting light from the latter; and cam means linked with the light source and reflector for effecting relative displacement in multiple axes between the light source and the reflector whereby to enable the headlight to produce two different beams of light, the cam means comprising a first cam member and a second cam member and defining an axis of rotation of said first cam member, the cam members cooperating with each other to convert rotary motion of the first cam member about the axis of rotation into a first straight line motion of the second cam member, the first straight line motion being collinear with the axis of rotation.

2. A headlight according to claim 1, wherein the first cam member is arranged to exert a thrust on the second cam member, parallel to the axis of rotation, during rotation of the first cam member with respect to the second cam member.

3. A headlight according to claim 1, defining a plane at right angles to the axis of rotation, wherein at least one of the cam members includes a ramp defining a surface extending away from the plane in a path defining a circular arc about the axis of rotation.

4. A headlight according to claim 1, wherein the light source comprises a lamp holder and a lamp carried by the lamp holder, the first and second cam members defining a passage through which a component selected from the lamp and the lamp holder can be passed.

5. A headlight according to claim 1, such that when the headlight is mounted on the vehicle, the first straight line motion is affected along a horizontal axis.

6. A headlight according to claim 1, for giving, selectively, a main beam and a dipped beam, wherein the relative displacement changes the optical relationship between the reflector and the light source so as to change the illumination given by the headlight between the main beam and the dipped beam.

7. A headlight according to claim 1, defining a plane at right angles to the axis of rotation, the cam means being adapted so that the first and second cam members can perform a second straight line motion with respect to each other in the plane.

8. A headlight according to claim 7, adapted so that, when the headlight is mounted on the vehicle, the second straight line motion is effected along a vertical axis.

9. A headlight according to claim 1, wherein one of the cam members includes a toothbed sector, the headlight further including a micromotor coupled to the toothed sector for driving the latter about only the axis of rotation to provide relative displacement in multiple axes between the light source and the reflector.

10. A headlight according to claim 9, in combination with a vehicle having electrical networks for dipped beam lighting and main beam lighting, the headlight being mounted in the vehicle, wherein the headlight is connected to the network so as to be supplied with and controlled by the voltages available on the networks.

* * * * *